United States Patent
Funato et al.

(10) Patent No.: US 9,805,147 B2
(45) Date of Patent: Oct. 31, 2017

(54) ELECTROMAGNETIC NOISE ANALYSIS METHOD AND DEVICE

(71) Applicant: Hitachi, Ltd., Chiyoda-ku, Tokyo (JP)

(72) Inventors: Hiroki Funato, Tokyo (JP); Takashi Suga, Tokyo (JP); Yoshiyuki Tsuchie, Tokyo (JP); Satoshi Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 485 days.

(21) Appl. No.: 14/370,433

(22) PCT Filed: Feb. 6, 2013

(86) PCT No.: PCT/JP2013/052656
§ 371 (c)(1),
(2) Date: Jul. 2, 2014

(87) PCT Pub. No.: WO2013/132948
PCT Pub. Date: Sep. 12, 2013

(65) Prior Publication Data
US 2014/0372092 A1   Dec. 18, 2014

(30) Foreign Application Priority Data

Mar. 8, 2012  (JP) ................................ 2012-051146

(51) Int. Cl.
*G06F 17/50*  (2006.01)
*G01R 29/08*  (2006.01)

(52) U.S. Cl.
CPC ...... *G06F 17/5009* (2013.01); *G06F 17/5036* (2013.01); *G01R 29/0814* (2013.01); *Y02T 10/82* (2013.01)

(58) Field of Classification Search
USPC ............................................... 703/2, 13, 18
See application file for complete search history.

(56) References Cited

U.S. PATENT DOCUMENTS 6,104,204 A * 8/2000 Hayama ............... G01R 1/0458
324/750.08
8,341,837 B2 * 1/2013 Braunstein ........... H01R 25/006
29/593

(Continued)

FOREIGN PATENT DOCUMENTS

JP 2001-155048 A   6/2001
JP 2003-6260 A   1/2003

(Continued)

OTHER PUBLICATIONS

International Search Report (PCT/ISA/210) dated May 7, 2013, with English translation (Five (5) pages).

*Primary Examiner* — Thai Phan

(57) ABSTRACT

An object of the present invention is to provide an EMC design technique of a device including an electronic device mounted therein for implementing noise amount analysis of a system in which individual electronic devices are combined. A housing model is acquired, component models are selected and acquire, the acquired component models are connected using a wire, the acquired component models are arranged in the acquired housing model, the arranged component models connected using the wire is driven to generate electromagnetic noise from the component models and the wire, the generated electromagnetic noise is propagated in the housing model to calculate a noise amount, and an output process of outputting data of the calculated noise amount is performed. Thus, even in the system in which a plurality of electronic devices are combined, electromagnetic noise analysis of the system can be easily performed, and a noise reduction design can be supported.

20 Claims, 14 Drawing Sheets

(56) References Cited

U.S. PATENT DOCUMENTS

| | | | |
|---|---|---|---|
| 2002/0029005 A1* | 3/2002 | Levendowski | ...... A61B 5/0478 |
| | | | 600/545 |
| 2002/0157067 A1 | 10/2002 | Yaguchi | |
| 2005/0268261 A1 | 12/2005 | Hatakeyama et al. | |
| 2009/0314539 A1* | 12/2009 | Kawaguchi | ............ H01F 10/08 |
| | | | 174/350 |
| 2010/0327899 A1 | 12/2010 | Imaizumi | |
| 2011/0320995 A1 | 12/2011 | Osaka et al. | |

FOREIGN PATENT DOCUMENTS

| | | | |
|---|---|---|---|
| JP | 2005-339003 A | 12/2005 |
| JP | 2010-198201 A | 9/2010 |
| JP | 2011-13833 A | 1/2011 |

* cited by examiner

FIG. 5

| FREQUENCY [Hz] | UPHASE | | | | | |
|---|---|---|---|---|---|---|
| | OUTPUT IMPEDANCE (Zac) | | CURRENT SOURCE (Iac) | | CONNECTION IMPEDANCE (Zac) | |
| | REAL PART | IMAGINARY PART | REAL PART | IMAGINARY PART | REAL PART | IMAGINARY PART |
| 150000.00 | 596.86 | 808.73 | -0.000356 | -0.0020244 | 596.86 | 808.73 |
| 150631.91 | 617.66 | 715.36 | -0.0004169 | -0.0020942 | 617.66 | 715.36 |
| 151266.49 | 628.67 | 651.29 | -0.0004724 | -0.0021708 | 628.67 | 651.29 |
| 151903.74 | 638.20 | 601.74 | -0.0005271 | -0.0022528 | 638.20 | 601.74 |
| 152543.67 | 647.54 | 563.19 | -0.0005801 | -0.0023397 | 647.54 | 563.19 |
| 153186.30 | 657.51 | 532.32 | -0.0006318 | -0.0024309 | 657.51 | 532.32 |
| 153831.64 | 668.48 | 506.71 | -0.0006826 | -0.0025261 | 668.48 | 506.71 |
| 154479.69 | 707.08 | 524.35 | -0.0006943 | -0.0026465 | 707.08 | 524.35 |
| 155130.48 | 758.99 | 560.88 | -0.0006898 | -0.0027768 | 758.99 | 560.88 |
| 155784.01 | 815.43 | 603.16 | -0.0006828 | -0.0029086 | 815.43 | 603.16 |
| 156440.29 | 875.95 | 656.80 | -0.0006703 | -0.0030419 | 875.95 | 656.80 |
| 157099.33 | 934.30 | 709.48 | -0.0006521 | -0.0031274 | 934.30 | 709.48 |
| 157761.15 | 962.89 | 678.76 | -0.0006296 | -0.0029364 | 962.89 | 678.76 |
| 158425.76 | 988.84 | 645.25 | -0.0006048 | -0.0027435 | 988.84 | 645.25 |
| 159093.17 | 1010.55 | 602.58 | -0.0005806 | -0.0025482 | 1010.55 | 602.58 |
| 159763.39 | 1027.66 | 556.59 | -0.0005541 | -0.0023511 | 1027.66 | 556.59 |

FIG. 12

| TYPE | PART NAME | BASIC FUNCTION | COST (¥) | WEIGHT (kg) | SIZE (M) | NOISE MODEL | HOUSING MODEL |
|---|---|---|---|---|---|---|---|
| INVERTER | A01 | 360V, 200A | 20000 | 15 | 0.2*0.5*0.5 | a01.csv | a01.cad |
| | B02 | 300V, 150A | 15000 | 10 | 0.2*0.2*0.2 | b02.csv | b02.cad |
| | B03 | 400V, 150A | 25000 | 20 | 0.3*0.3*0.3 | b03.csv | b03.cad |
| CONVERTER | B04 | 12V, 300A | 10000 | 5 | 0.15*0.15*0.1 | b04.csv | b04.cad |
| | C05 | 15V, 50A | 20000 | 25 | 0.4*0.4*0.1 | c05.csv | c05.cad |
| ... | | | | | | | |

FIG. 15

| CONDITION | PART A | PART B | COST | WEIGHT | WIRING PATH | SPECIFICATION 1 | SPECIFICATION 2 | SPECIFICATION 3 |
|---|---|---|---|---|---|---|---|---|
| 1 | A01 | A02 | 20000 | 20 | 1 | OK | NG | NG |
|   |     |     |       |    | 2 | OK | NG | OK |
|   |     |     |       |    | 3 | NG | OK | OK |
| 2 | A01 | B02 | 30000 | 40 | 1 | OK | OK | OK |
|   |     |     |       |    | 2 | OK | NG | OK |
|   |     |     |       |    | 3 | OK | OK | OK |
| 3 | B01 | C02 | 40000 | 30 | 1 | OK | NG | NG |
|   |     |     |       |    | 2 | OK | OK | OK |
|   |     |     |       |    | 3 | NG | OK | OK |

ELECTROMAGNETIC NOISE ANALYSIS METHOD AND DEVICE

TECHNICAL FIELD

The present invention relates to an electromagnetic noise analysis technique of a device including an electronic device mounted therein.

BACKGROUND ART

As a background art of a field to which the present technology pertains, there is PTL 1. PTL 1 discloses an EMC design support system including a specifying unit configured to specify a design object, a first storage unit configured to store EMC-related data related to design precautions representing content to be paid special caution against influence of a noise at the time of design, a first search unit configured to search for data related to the design object specified by the specifying unit from among EMC-related data related to a previous trouble stored in the first storage unit, and a display unit configured to display the data searched by the first search unit.

Further, the inventors have disclosed electromagnetic noise analysis calculation models and systems as a design technique for reducing unnecessary electromagnetic radiation generated from a circuit board as disclosed in PTL 2. Of these, the former relates to a design technique, and the latter relates to an electromagnetic noise calculation model.

CITATION LIST

Patent Literature

PTL 1: JP 2001-155048 A
PTL 2: JP 2010-198201 A

SUMMARY OF INVENTION

Technical Problem

An electromagnetic noise amount analysis prediction is a technique essential to development of electronic devices. Generally, an analysis model is roughly classified into a technique based on an equivalent circuit and a technique based on electromagnetic field analysis. When an analysis target is a single-body device such as a power supply device or an amplifier and developed by a single manufacturer, a noise amount analysis calculation can be implemented using any of the above-mentioned techniques. However, in large-scaled devices in which a huge number of electronic devices are mounted and the respective devices are supplied by different manufacturers such as automobiles, it is very difficult to perform electromagnetic noise analysis of the entire device. The reason is because definitions of noise models of individual electronic devices for implementing electromagnetic noise analysis of the large-scaled device, a combination method of the models, and a noise analysis technique for the entire combined device are ambiguous.

The present invention was made to solve the above problems. In other words, it is an object of the present invention to provide an EMC design technique for a device including an electronic device mounted therein, which is capable of implementing a noise amount prediction of a system in which individual electronic devices are combined.

Solution to Problem

In order to solve the above problem, for example, a configuration set forth in claims is employed. The present disclosure discloses a plurality of solutions for solving the above problems. As an example of the solution, a housing model is acquired, component models are selected and acquire, the acquired component models are connected using a wire, the acquired component models are arranged in the acquired housing model, the arranged component models connected using the wire is driven to generate electromagnetic noise from the component models and the wire, the generated electromagnetic noise is propagated in the housing model to calculate a noise amount, and an output process of outputting data of the calculated noise amount is performed.

Advantageous Effects of Invention

According to the present invention, even in the case of a system in which a plurality of electronic devices are combined, it is possible to easily perform electromagnetic noise analysis of the system and support noise reduction design.

BRIEF DESCRIPTION OF DRAWINGS

FIG. 5 is a diagram illustrating data corresponding to one port of a part noise model according to an embodiment of the present invention.

FIG. 12 is a diagram illustrating a database format of a part noise model according to an embodiment of the present invention.

FIG. 15 is a diagram illustrating a part combination analysis result according to an embodiment of the present invention.

DESCRIPTION OF EMBODIMENTS

Hereinafter, exemplary embodiments of the present invention will be described with reference to the appended drawings. Here, an electric vehicle and parts of an electric vehicle will be described as a system (entire device) and components (parts), respectively, but the present invention is not limited to this example and can be applied to any other device.

First Embodiment

Figure 1:
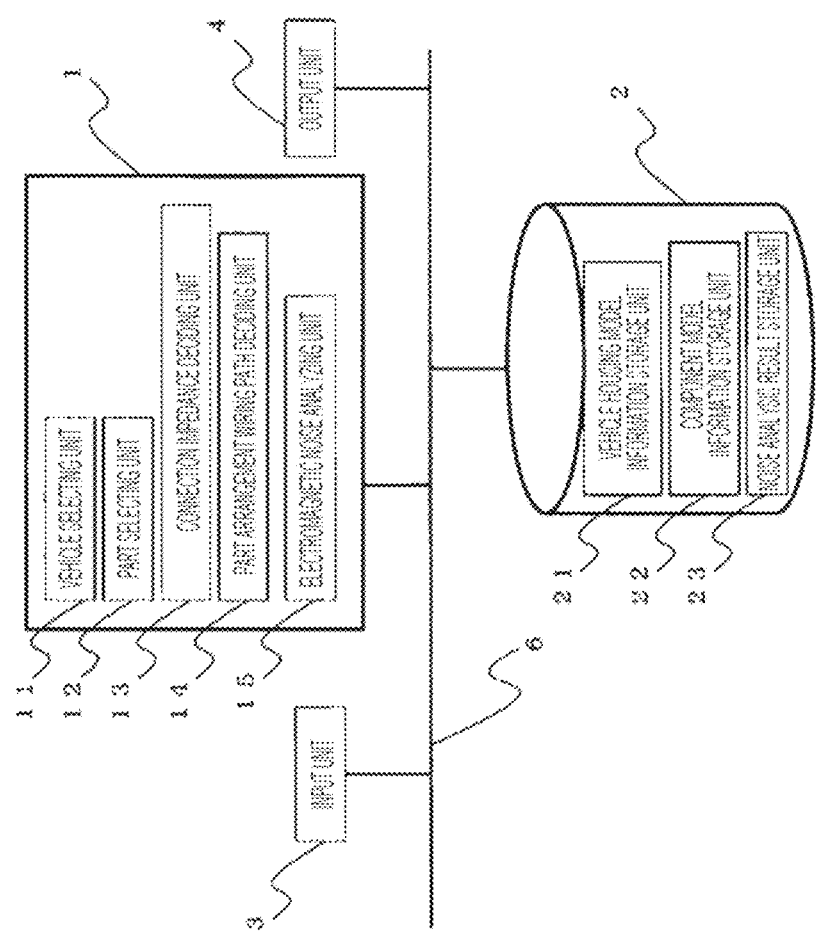
FIG. 1 is a configuration diagram of a computer system according to an embodiment of the present invention.

FIG. 1 illustrates a configuration of a computer system for implementing the present invention. The present computer system includes a processing unit 1, a storage unit 2, an input unit 3, an output unit 4, and a connection line 5 connecting the units with one another. The processing unit 1 is a processor such as a central processing unit (CPU), the storage unit 2 is a semiconductor memory such as a hard disk drive (HDD), the input unit 3 is, for example, a keyboard, a mouse, or a network input, the output unit 4 is, for example, a display, a printer, or a network output, and the connection line 5 is, for example, a wire on a circuit board, a connecting cord, or a network. The configurations need not necessarily be installed in the same place and may be arranged at remote sites and connected via a network or the like.

As a program stored in the storage device 2 or the like is read and executed, the processing unit 1 functions as a vehicle selecting unit 11, a part selecting unit 12, a connection impedance deciding unit 13, a part arrangement wiring path deciding unit 14, or an electromagnetic noise analyzing unit 15. The storage unit 2 stores a vehicle housing model information storage unit 21, a part model information storage unit 22, and a noise analysis result storage unit 23.

Next, parts serving as an electromagnetic noise analysis target and models of a vehicle will be described with reference to FIGS. 2 to 8. In the present embodiment, an automobile, and an inverter, a battery, and a motor which are parts of automobile are described as an example. Hereinafter, an entire device such as a vehicle is referred to as an "entire device" or "system," and an electronic part mounted therein is referred to as a "part" or a "component." Further, all models refer to electronic data which is dealt with on a computer system.

Figure 2:
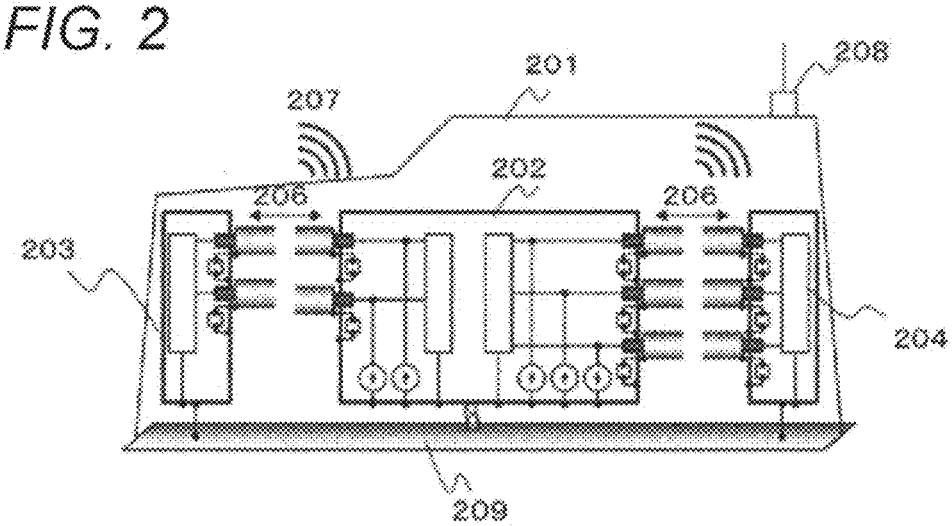
FIG. 2 is a diagram illustrating a noise model of a system according to an embodiment of the present invention.

FIG. 2 illustrates an example of a noise analysis model outline of an entire vehicle using a noise model. The noise analysis model includes a vehicle housing model 201 and component models such as an inverter model 202, a battery model 203, and a load model 204 which are included in the vehicle housing model 201. The load model 204 represents a noise model of a motor. The component models are connected to one other via wires 206. A noise current 206 flowing through the wire is one of causes of noise emission 207. The inverter model 202 includes a current source 205, but the load model 204 and the battery model 203 are dealt as passive parts, and a description of the current source is omitted since it is considered not to generate noise.

For a vehicle housing, a three-dimensional (3D) analysis model is used. Thus, propagation of known electromagnetic noise can be predicted and calculated by analysis. Here, an inverter, a motor, and a battery are illustrated as an example, but even for other devices, similarly, macro models of devices may be combined and incorporated into a 3D vehicle model. Further, as a component that is likely to be affected by noise, a vehicle-mounted antenna 208 for a radio or communication is also included in the 3D analysis model.

Figure 3:
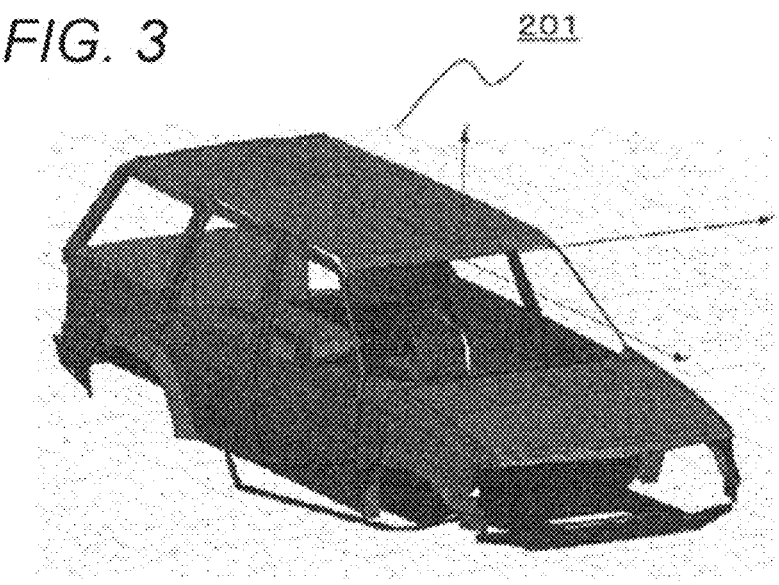
FIG. 3 is a diagram illustrating a noise model of a vehicle housing according to an embodiment of the present invention.

FIG. 3 illustrates an example of the vehicle housing model 201. The vehicle housing model 201 is one in which a body of an automobile is represented in three dimensions. Particularly, the vehicle housing model 201 includes a body or chassis of a metallic housing on which influence of an electromagnetic wave is large, and an interior or a tire made of resin, a suspension, and the like on which influence of an electromagnetic wave is small can be omitted as long as there is no influence on propagation of an electromagnetic wave.

Generally, the analysis model such as the vehicle housing model is roughly classified into a technique based on an equivalent circuit and a technique based on electromagnetic field analysis. In the equivalent circuit technique, a vehicle housing is represented by an equivalent circuit, and since a parasitic element to be considered is limited to a noise path, the accuracy is likely to degrade, but a load is small, and analysis can be performed at a high speed. On the other hand, in the electromagnetic field analysis technique, an actual vehicle housing is meshed in a 3D shape, and an analysis period of time is long, but the accuracy of solving propagation of electromagnetic noise is high. In order to use the noise analysis of the entire vehicle for a design, it is important to properly use the equivalent circuit technique and the electromagnetic field analysis technique. In the present embodiment, the electromagnetic field analysis is performed using a meshed 3D shape as a vehicle housing model.

Figure 4:
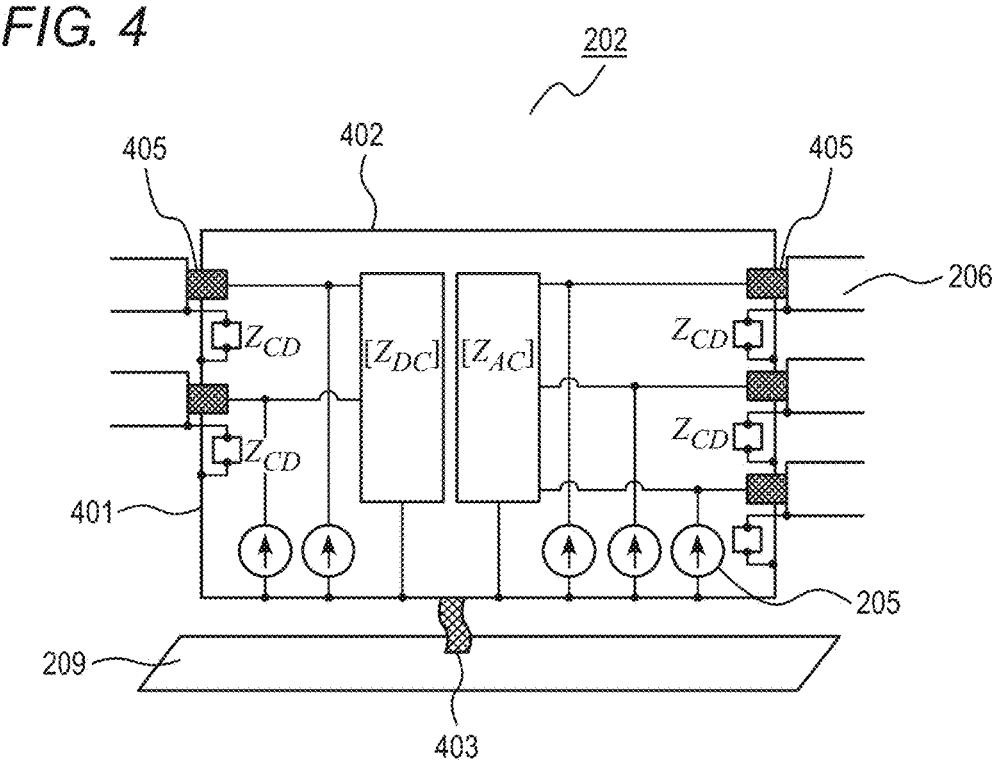
FIG. 4 is a diagram illustrating a noise model of a part according to an embodiment of the present invention.

FIG. 4 illustrates the inverter model 209 as an example of the component model. Examples of the component model include a macro model and an equivalent circuit model, but the macro model is employed in the present embodiment.

Data of the macro model include a housing and circuit elements in the housing. A device housing 401 of the inverter model 209 is a 3D model based on the shape of a housing of an actual inverter. In the inside of the inverter model 209, it is necessary to consider the current source 205 serving a noise source, an output impedance 402, and a connection impedance of a cable GND 403 (connecting the inverter with a chassis 209). In this configuration, data of frequency dependence serving as a circuit element is included. A three-phase output 403 and a power input 404 are terminals which are different in function and actual shape but will be similarly described as a noise model. Each of both terminals has a connection impedance $Z_{CD}$. As the device inside is specifically defined as described above, it is possible to prevent an enormous increase in an analysis period of time which is likely to be a problem in overall analysis. Further, as the device housing 401 which is likely to function as a path of electromagnetic noise or an antenna of electromagnetic noise is expressed by a 3D model, it is possible to prevent the noise calculation accuracy from being lowered.

FIG. 5 illustrates an example of data corresponding to one phase among the three phase output terminals 403 in the inverter model illustrated in FIG. 4. An output impedance, a noise current source, and a connection impedance are described in a complex form for each frequency. A parts manufacturer creates such a noise model for a terminal decided by a system manufacturer. Such data is stored in the part noise model together with data of another current source 205, another output impedance 402, another cable GND 403, and another power input terminal 405.

Figure 6:
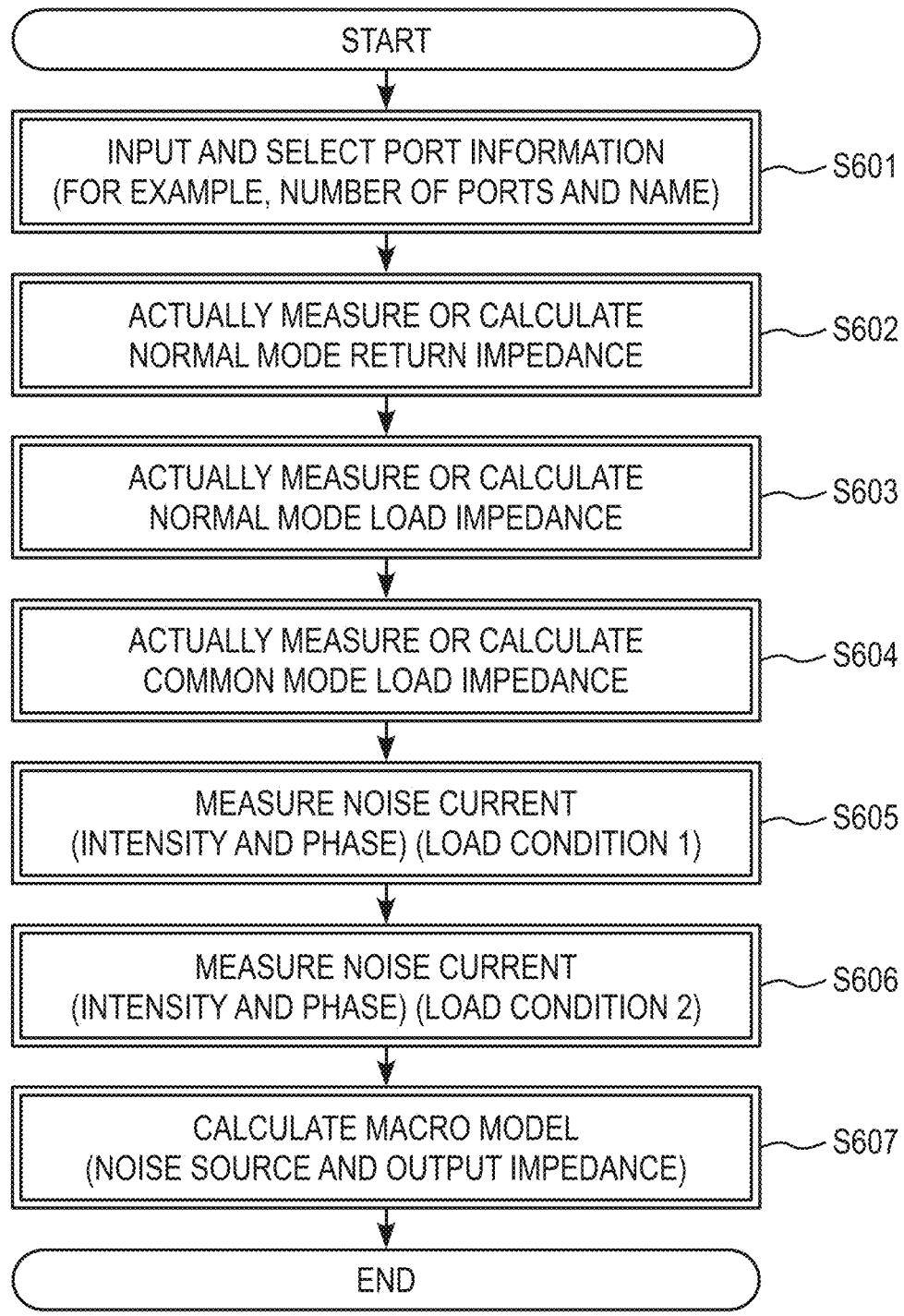
FIG. 6 is a diagram illustrating the flow of an EMC design technique according to an embodiment of the present invention.
Figure 7:
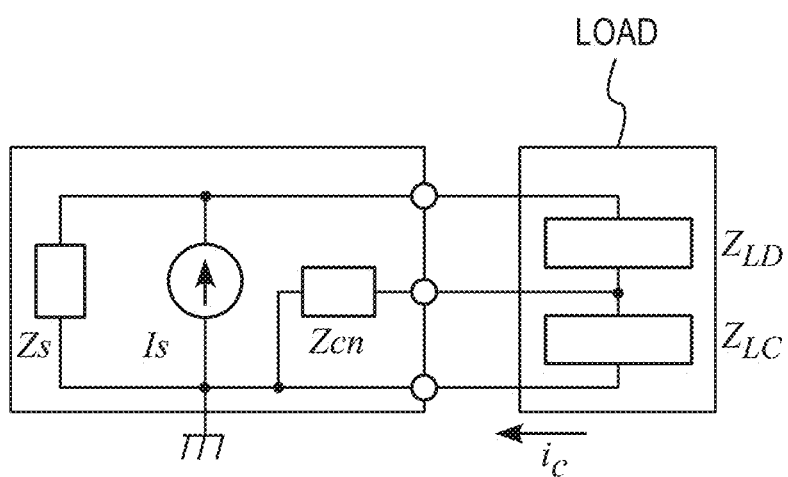
FIG. 7 is a diagram illustrating of functional blocks an EMC design technique according to an embodiment of the present invention.

Next, a method of creating the above-described part macro model will be described. FIG. 6 illustrates a process, and FIG. 7 illustrates a model extracted by one port.

First, in order to identify each terminal included in a noise model, a name is defined for each terminal, and used as a port name (S601). An arbitrary name may be used as a port name as long as it can specify a terminal, for example, AC (U phase) may be used as a port name in the case of a U phase of a motor drive current output terminal. Then, a return path impedance ($Z_{CN}$) of a normal mode current is decided (S602). As a method of deciding a value of $Z_{CN}$, there are a method using actual measurement, a method using a theoretical formula, a method using a simulation such as electromagnetic field analysis, and the like, but any of these methods can be used. Then, frequency characteristics of a normal mode impedance ($Z_{LD1}$) of a load used as a first condition are obtained by an actual measurement or a simulation (S603). Then, frequency characteristics of a common mode impedance ($Z_{CD1}$) of the first condition load are obtained by an actual measurement or a simulation (S604). Then, intensity and a phase of a common mode noise current ($i_{C1}$) flowing through the load are obtained by an actual measurement or simulation (S605). Then, an impedance of the load is changed, and using the changed impedance of the load as a second condition, an normal mode impedance ($Z_{LD2}$), a common mode impedance ($Z_{CD2}$), and intensity and a phase of a noise current ($i_{C2}$) are similarly obtained by an actual measurement or a simulation (S606). Based on the above-obtained values, the noise current source ($I_S$) and the output impedance ($Z_S$) can be obtained using Mathematical Formulas 1, 2, and 3, and the macro model can be calculated (S607).

[Mathematical Formula 1]

$$Z_S = \frac{i_{C2} \cdot (Z_{LC2} + Z_{CN}) \cdot Z_{F2} - i_{C1} \cdot (Z_{LC1} + Z_{CN}) \cdot Z_{F1}}{i_{C1} \cdot (Z_{LC1} + Z_{CN}) - i_{C2} \cdot (Z_{LC2} + Z_{CN})}$$

Mathematical Formula 1

Provided that, $Z_{F1} = \dfrac{Z_{CN} \cdot Z_{LC1}}{Z_{CN} + Z_{LC1}} + Z_{LD1}$

[Mathematical Formula 2]

$$I_S = \frac{i_{C1}(Z_{LC1} + Z_{CN})}{Z_{CN}} \cdot \left(\frac{Z_{F1}}{Z_S} + 1\right)$$

Mathematical Formula 2

[Mathematical Formula 3]

$$I_S = \frac{i_{C1}(Z_{LC1} + Z_{CN})}{Z_{CN}} \cdot \left(\frac{Z_{F1}}{Z_S} + 1\right)$$

Mathematical Formula 3

Figure 8:
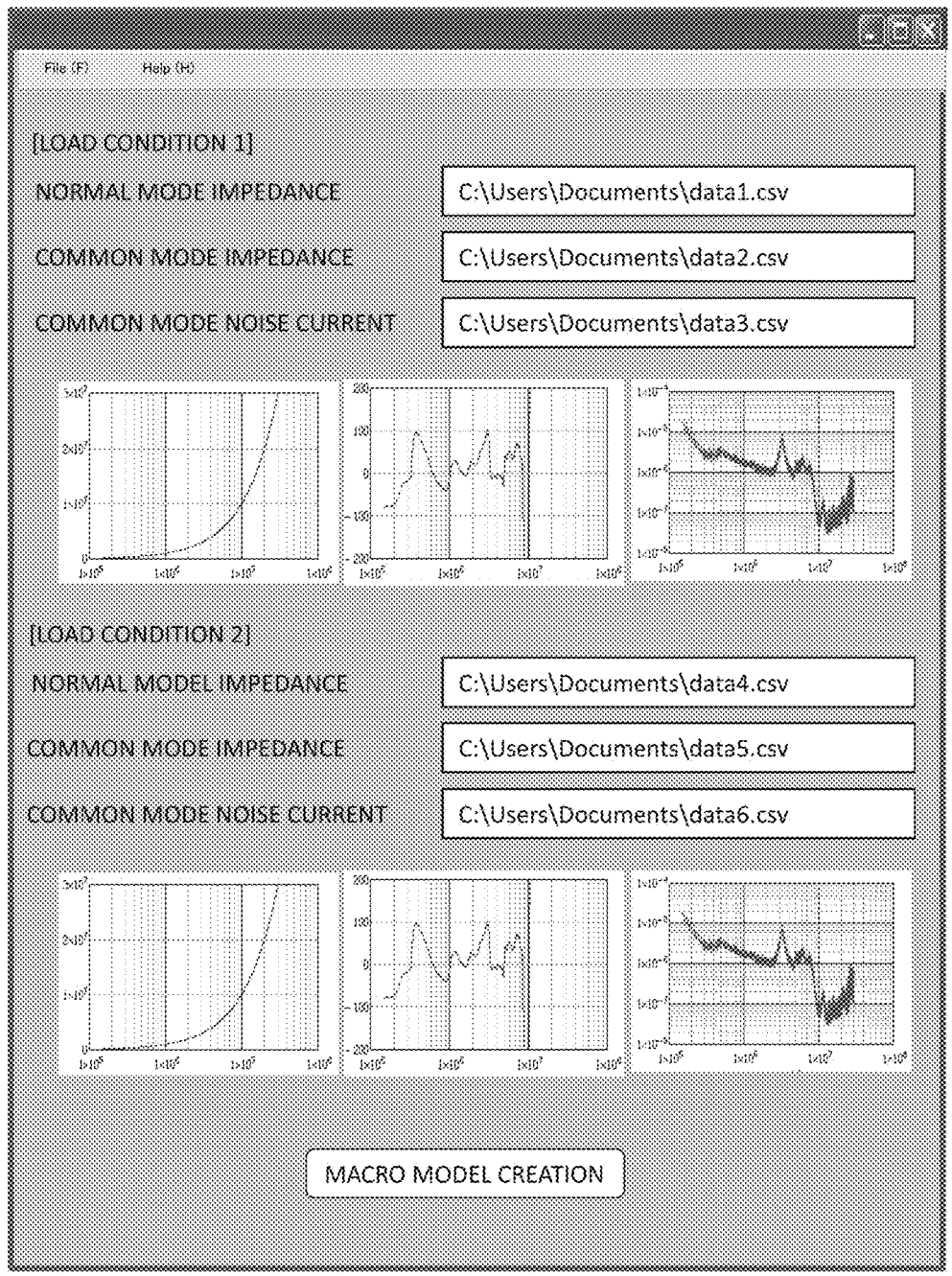
FIG. 8 is a diagram illustrating a tool input screen used to create a part noise model according to an embodiment of the present invention.

In the process of creating the parts noise model, when information such as an impedance is input, model information can be output by an automatic calculation. This can be shared on a platform such as a web. FIG. 8 illustrating a tool input screen image. In the input screen, files of a normal mode impedance, a common mode impedance, and a common mode noise current corresponding to a frequency is designated for each load condition.

Figure 9:
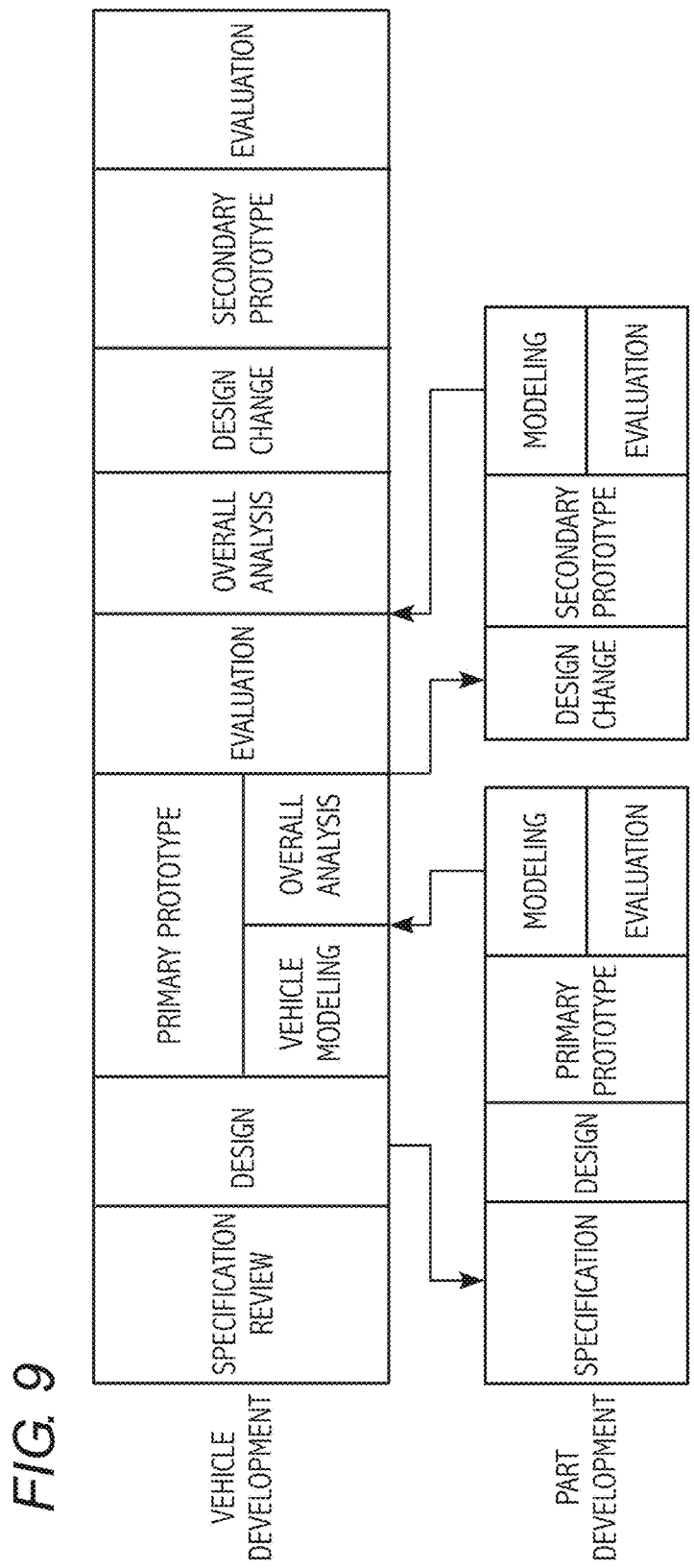
FIG. 9 is a diagram illustrating a development phase relation between a part and a system according to an embodiment of the present invention.

FIG. 9 illustrates a timetable for performing creation and analysis of the present noise model during a vehicle development process and a part development process at the time of actual product development. The vehicle development is performed by an automobile manufacturer, and the part development is performed by a parts manufacturer.

In the vehicle development, first, a vehicle specification is made, and a vehicle is designed based on the specification. At this time, a specification of parts used in the vehicle is decided and proposed to the parts manufacturer.

The parts manufacturer designs, makes, and evaluates a primary prototype (a design verification prototype; a prototype can be used even in a simulation) based on the proposed specification, and proposes the primary prototype to the automobile manufacturer. At this time, the part noise model is created, and it is verified that noise generated from a part is a reference level or less, and then the noise model is supplied to the automobile manufacturer.

The automobile manufacturer makes a primary prototype (a design verification prototype), performs the noise analysis of the entire device by applying the part noise model supplied from the parts manufacturer, and evaluates the primary prototype.

When the evaluation result does not satisfy the criterion, the automobile manufacturer gives a design change notification to the parts manufacturer, and the parts manufacturer designs again. Then, the parts manufacturer makes a secondary prototype (a mass-production prototype) of a designed or re-designed part, and supplies a part and a noise model to the automobile manufacturer. Then, the automobile manufacturer performs the noise analysis again, changes the design change (only if necessary), and makes and evaluates a secondary prototype (a mass-production prototype).

Particularly, in most of vehicle-mounted devices, a primary prototype (a design verification prototype) and a secondary prototype (a mass-production prototype) are made. In both the vehicle development and the part development, the model is created based on the primary prototype, and the automobile manufacturer performs overall analysis. Then, a noise requirement specification of a part or a wiring design is improved if necessary based on the analysis result to make a mass-production prototype. Thus, it is possible to prevent a problem from occurring, for example, because a noise amount exceeds a reference level. Further, when a part is not a new development part, a noise amount analysis prediction may be performed before the primary prototype for the vehicle development is made, and in this case, it is possible to a design from being changed after the primary prototype is made. Thus, the system manufacturer can reduce a development period of time and a cost. The parts manufacturer can provide an additional value, for example, can appeal advantages such as deletion of an unnecessary countermeasure and cost and a low noise performance through a model.

Figure 10:
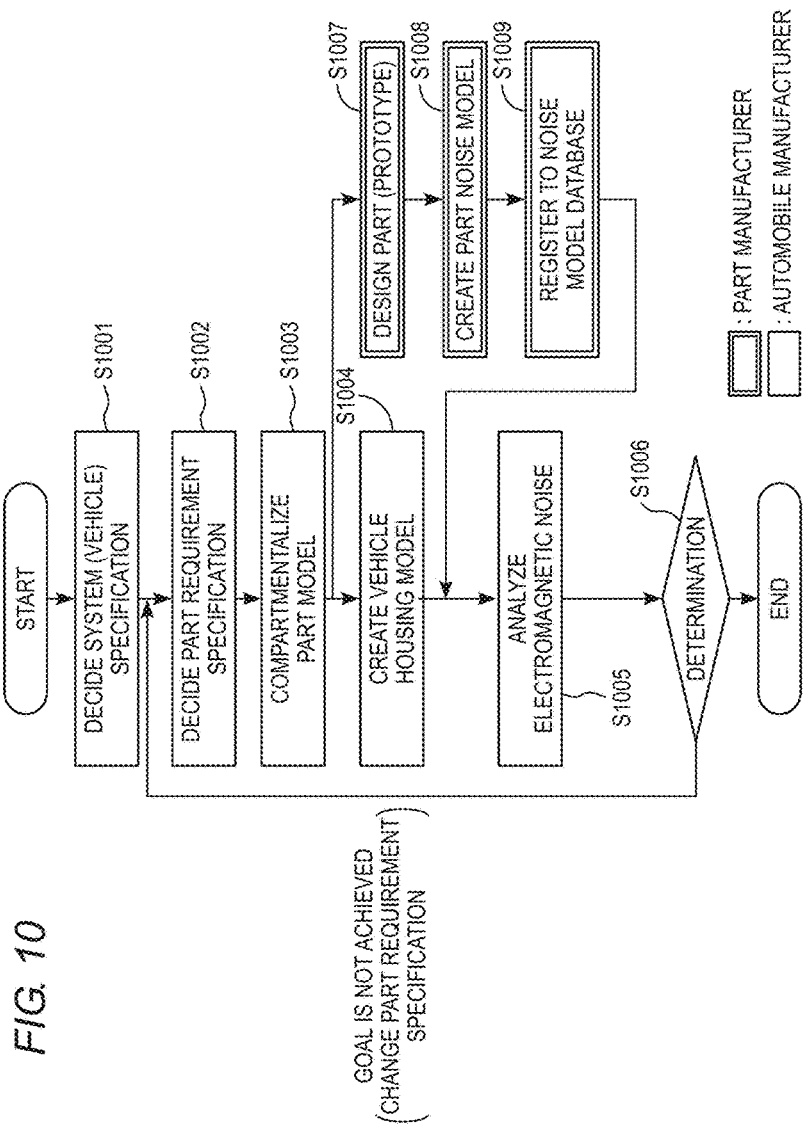
FIG. 10 is a flowchart illustrating noise analysis according to an embodiment of the present invention.

FIG. 10 illustrates a series of flows of performing an electromagnetic noise analysis prediction on the entire system and achieving a target specification. In the present embodiment, the description will proceed with electromagnetic noise design development of an automobile. An inverter is assumed to be a main noise source. The description will proceed with reference to the flow of FIG. 1.

First, the system manufacturer, that is, the automobile manufacturer in this example, decides a specification of the entire vehicle (S1001).

Then, the automobile manufacturer decides a parts specification necessary to implement the decided vehicle specification (S1002). Generally, parts are supplied from a variety of different manufacturers.

Then, compartmentalization of a part noise model used for electromagnetic noise analysis of a vehicle is performed (S1003).

Basically, the compartmentalization is performed in units of assembled parts For example, in the case of a three-phase motor drive inverter system of a hybrid automobile, a part configuration includes an inverter, a three-phase output cable, motor, a power cable, and a battery, and a part noise model is necessary for each of the parts. In other words, a type of part to be used is specified, and a format used to store a noise model is designated according to the type.

In other words, in the step until now, the automobile manufacturer initially designs a part arrangement and a wiring path inside a vehicle body, and supplies this information and requirements (format) of a noise model which is concomitantly necessary to the parts manufacturer. Further, the automobile manufacturer reviews an operation mode in which noise analysis needs to be performed, crates a requirement specification for an operation mode of a part represented by a noise model, and includes the created specification as the requirements of the noise model. Then, the automobile manufacturer proposes the part requirement specification to the parts manufacturer. The part requirement specification includes the specification of the noise model as well. In other words, the automobile manufacturer supplies the part specification, a format of the noise model on which noise analysis is performed, and an operation mode in which noise analysis is performed to the parts manufacturer.

The parts manufacturer designs a part and makes a prototype based on the requirement specification received from the automobile manufacturer (S1009), and creates a part noise model (S1010). Then, the parts manufacturer supplies the part noise model created while making, evaluating, and shipping a prototype of an actual device to the automobile manufacturer (S1011).

While the parts manufacturers are creating the models, the automobile manufacturer creates a vehicle housing noise model (S1004). The vehicle housing model includes 3D data of a metallic housing of a vehicle body and an arrangement position (or a candidate thereof) a part and a wire.

Then, the automobile manufacturer combines the part noise models supplied from the parts manufacturers and arranges the parts noise models in the vehicle housing model. Then, a state in which the noise analysis can be performed is created. Then, an electromagnetic noise amount is predicted and calculated using the entire analysis model obtained by the noise analysis (S1005).

When the obtained noise amount exceeds a regulation value, a condition complying with a regulation is found, for example, by improving a part arrangement or a wiring path in a vehicle, or a combination of parts. Alternatively, in order to comply with a regulation, there is a method of using input/output (I/O) characteristics of a necessary part as an output, proposing the I/O characteristic of the part to the parts manufacturer as an updated specification, and encouraging regulation compliance by an improvement in performance of a part (S1006).

As a result, it is possible to predict and calculate electromagnetic noise analysis of a large-scaled device which is hardly achieved in the related art in which each of the parts manufacturer and the system manufacturer creates a model for noise analysis.

Figure 11:
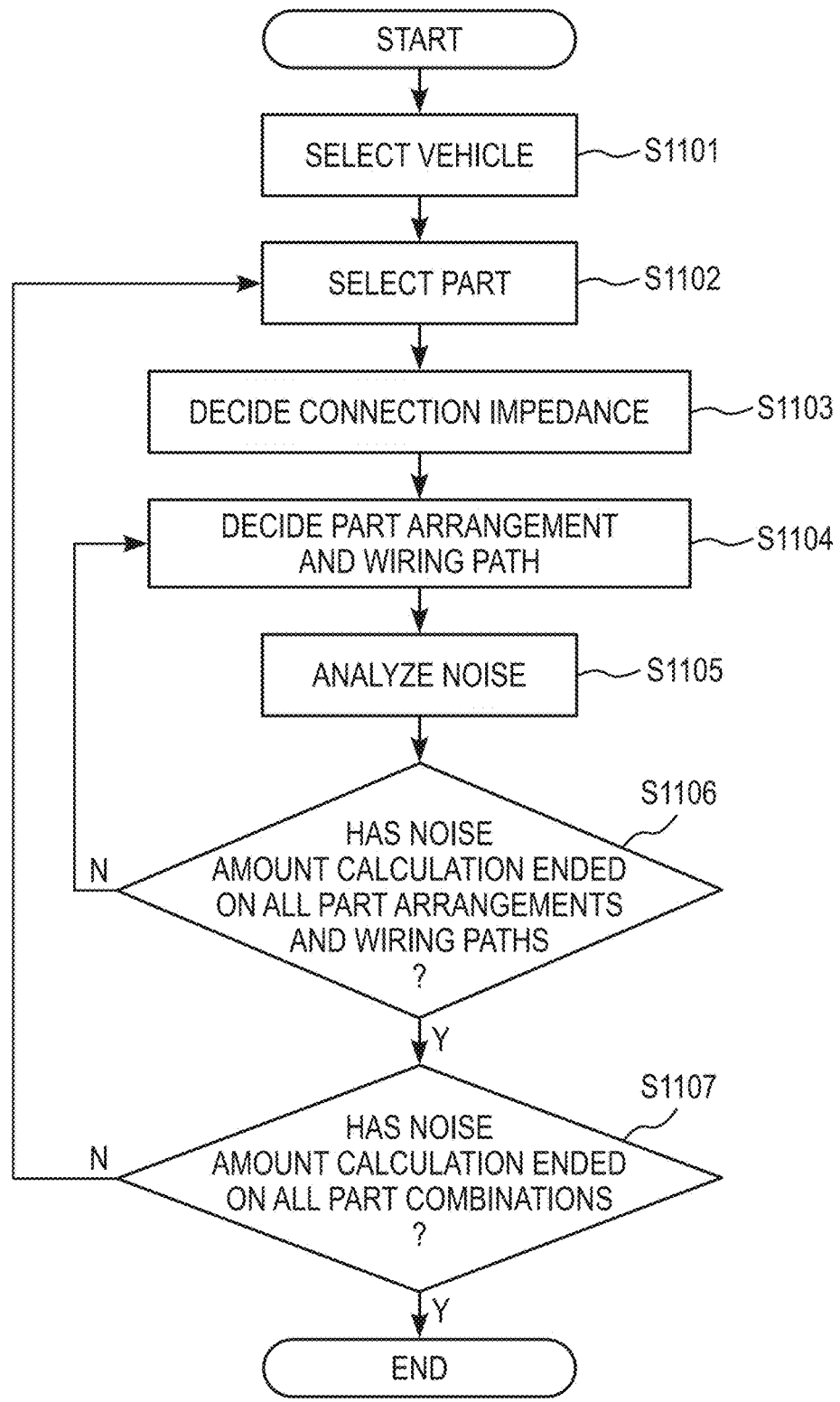
FIG. 11 illustrates main parts of electromagnetic noise analysis of FIG. 10.

FIG. 11 is a diagram for describing the electromagnetic noise analysis process (S1005) of FIG. 10.

First, the vehicle selecting unit 11 selects a vehicle housing model of a vehicle to be analyzed from a group of vehicle models stored in the vehicle housing model information storage unit 21, and acquires the vehicle housing model from the vehicle housing model information storage unit 21 (S1101). Then, the part selecting unit 12 selects each part which is to be mounted in the vehicle and to be subjected to noise analysis, and acquires a part model from the part model information storage unit 22. A plurality of part models are prepared for each type of part as illustrated in FIG. 12. In the present embodiment, for each of an inverter, a converter, a battery, a motor, and a cable, one part is selected to be used for noise analysis.

Then, a connection impedance deciding unit 13 decides a part connection impedance (S1103). Since the part connection impedance is an intermediate value between parts, in the case of different parts manufacturers, management thereof has to be performed by the system manufacturer. Further, for a calculation of electromagnetic noise, a connection impedance between parts can be a very important parameter. For example, using an actual measurement value of a connection shape of a same type as an initial value, reliability of a calculation can be maintained.

Next, the part arrangement wiring path deciding unit 14 decides the part arrangement and the wiring path (S1104). The part arrangement and the wiring path are stored in the vehicle housing model in advance. For one part and one wire, one part arrangement and one wiring path may be prepared, or a plurality of part arrangements and a plurality of wiring paths may be prepared, and one part arrangement and one wiring path may be selected from among the plurality of part arrangements and the plurality of wiring paths, respectively. The arrangement decision may be performed before the connection impedance is decided.

Figure 13:
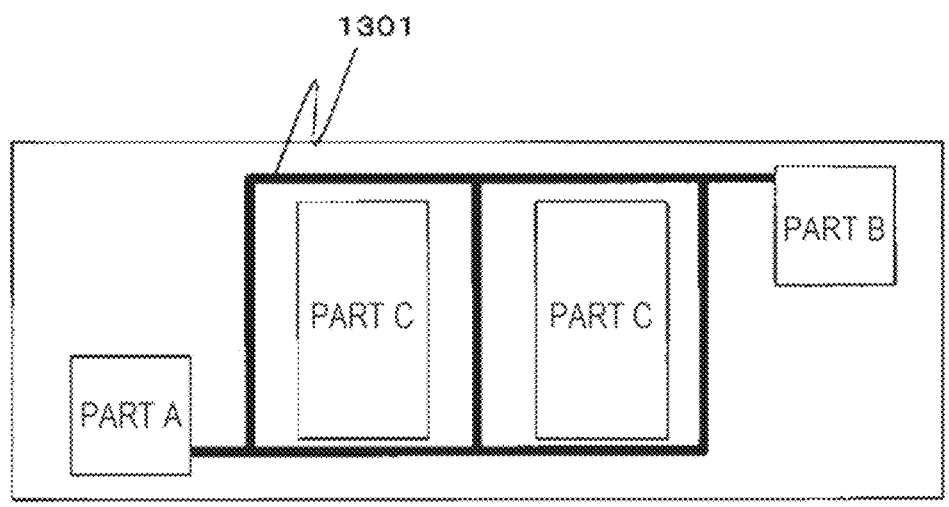
FIG. 13 is a diagram illustrating a wiring path candidate in a vehicle according to an embodiment of the present invention.

FIG. 13 illustrates an example in which a plurality of wiring paths are prepared. Practically, a wiring path 1301 is restricted by other parts or the like. When several points through which wires pass are set, an optimal wiring path can be obtained by analysis based on the points.

Then, the electromagnetic noise analyzing unit 15 calculates electromagnetic noise propagation (S1105). Preferably, the electromagnetic noise propagation is calculated using a general electromagnetic field calculation technique. A target value to be obtained by the calculation may be decided according to a calculation condition or a standard. For each mode, the components are driven in conjunction with one another, and noise generated from each component is propagated in a 3D space including a vehicle housing. Then, noise data is output.

The noise data may be represented such that a noise distribution in a 3D space is represented by a diagram, such that noise intensity at the position of the vehicle-mounted antenna 208 or a predetermined measurement point is represented by a numerical value, or according to whether a noise amount at a measurement point or the like is within a reference value specified in a standard.

Figure 14:
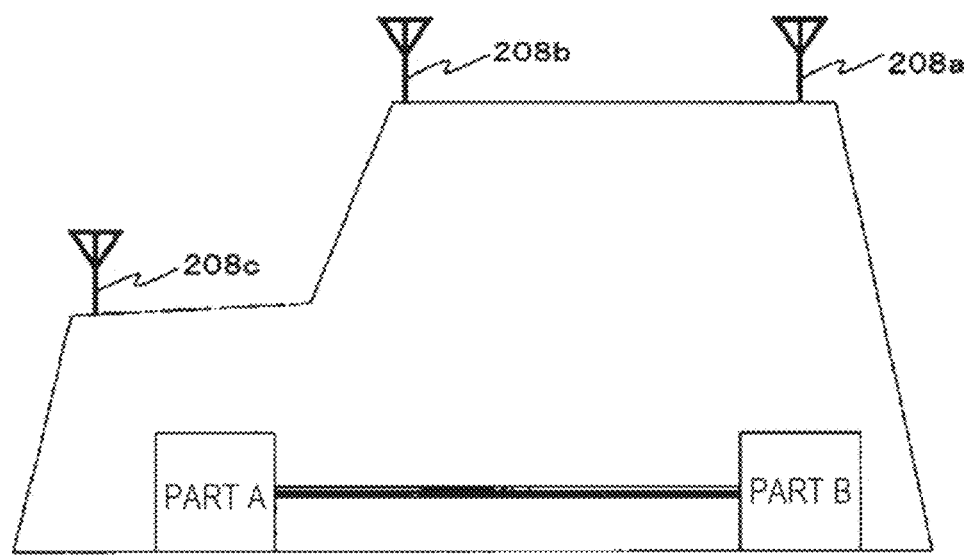
FIG. 14 is a diagram illustrating a vehicle-mounted antenna position candidate according to an embodiment of the present invention.

A measurement point will be described with reference to FIG. 14. For the part arrangement, similarly to the wiring path, when several conditions are set, an optimal condition can be obtained by parametric analysis. For example, in the vehicle development, an amount of noise mixed into the vehicle-mounted antenna is one of analysis target values, but several candidates or an end position and a step size from a start position may be set for the position of the vehicle-mounted antenna, and the optimal position of the vehicle-mounted antenna may be obtained by analysis according to the present analysis process. Antennas 209a to 209c in FIG. 14 are candidate positions of the vehicle-mounted antenna, but the noise amounts at all the candidate positions may be calculated to determine a position suitable for installation of the vehicle-mounted antenna.

When the noise amount calculation is completed, it is determined whether the noise amount calculation has ended on all part arrangements and wiring paths (S1106). The noise calculation may be performed on all part arrangements and wiring paths included in the vehicle housing model or may be performed on only selected part arrangements and wiring paths. When the noise amount calculation has ended on all part arrangements and wiring paths, the process proceeds to the next step, but if not, the process returns to S1104, the part arrangement and the wiring path are changed, and the noise amount calculation is performed again.

Then, it is determined whether the noise amount calculation has ended on all part combinations (S1107). It is because the noise amount is not a simple sum of noise generated from parts, and the noise amount changes according to a compatibility of parts. For example, there are cases in which a noise amount generated from an inverter significantly changes according to a connected motor. For this reason, it is determined whether the noise amount calculation has been performed on all part combinations. When the noise amount calculation has been performed on all part combinations, the process proceeds to the next step, but if not, the process returns to S1102, a part combination on which the noise amount calculation has not been performed is selected again, and the noise amount calculation is performed again.

As described above, the noise calculation is sequentially performed while changing the part combination, the part position, and the wiring path.

FIG. 15 illustrates an example of a noise propagation calculation result. In this example, the noise amount calculation is performed on a combination of a part A and a part B and wiring paths 1 to 3, and it is determined whether the result complies with standards 1 to 3 (whether a noise amount is smaller than a threshold value). It is possible to check compliance among a part combination, a wiring path, and a standard by analysis. When the part model and the vehicle model are already stored in a database, an overall process from an input of information to an output of a result can be automatically performed.

Generally, in electromagnetic noise analysis of a vehicle, either a noise amount mixed into a vehicle-mounted antenna or an electromagnetic noise amount leaking out to the periphery of a vehicle is consequential. For the result obtained by the analysis, a standard compliance determining unit determines whether a noise amount mixed into the vehicle-mounted antenna or leakage to the periphery of a vehicle body satisfies a standard or target value. If a standard is not satisfied, the wiring path, the part arrangement, or the part connection impedance needs to be changed by a correcting unit. In this way, it is possible to determine whether it complies with a standard while changing the part arrangement, the wiring path, or the part connection impedance, or it is possible to obtain a condition complying with a standard by a series of analysis. Output information is a condition satisfying a standard, that is, information of a part combination, an arrangement, a wiring path, or a connection impedance, and this serves as a design condition.

An example in which the model information is recorded in a database is illustrated. In actual production development, for example, a cost, a weight, and a size of a part as well as electromagnetic noise are also important parameters. In a noise analysis result to be output, a link to a noise model is preferably included in a part management table which is usually used. For example, for example, a function, a cost, a weight, and a size of a part (which are referred to as "attribute values") may be output together with a noise analysis result. Further, in the case of a cost or a weight, as illustrated in FIG. 15, a sum of costs or weights of a plurality of used parts may be output.

Further, conditions (part combinations, wiring paths, or the like) satisfying a standard may be collected and output. Furthermore, the conditions may be displayed to be arranged in the descending or ascending order of sums of weights or costs.

Second Embodiment

A second embodiment will be described with reference to FIG. 16. In the first embodiment, the macro model is used as the component model, but in the present embodiment, the equivalent circuit model is used. The remaining points are the same as in the first embodiment.

Figure 16:
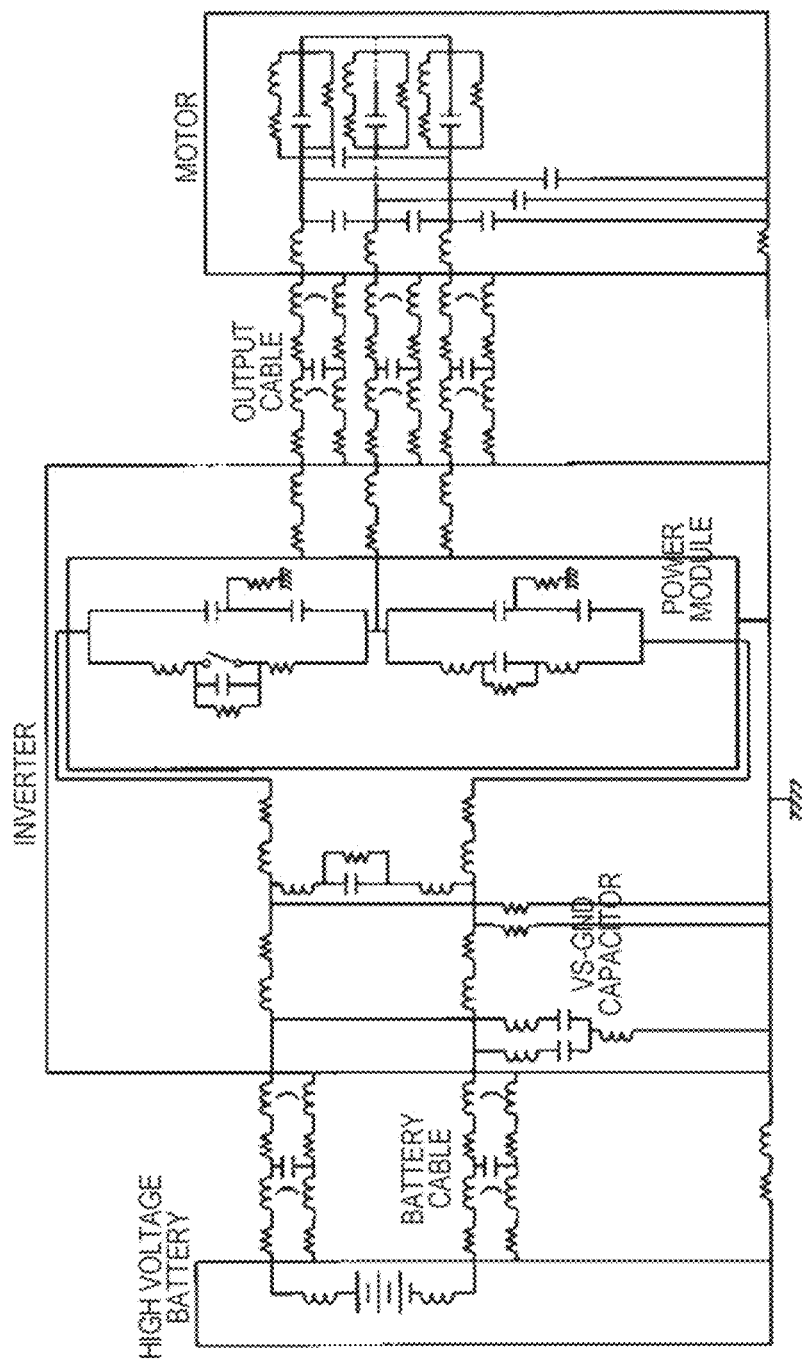
FIG. 16 is a diagram illustrating a noise model of a part according to another embodiment of the present invention.

FIG. 16 illustrates an example of an equivalent circuit model. An equivalent circuit is one in which an actual circuit inside a component is described using circuit symbols such as a capacitor, a coil, and an electric resistor. A part housing is a 3D model, similarly to the macro model. In the equivalent circuit model of FIG. 16, an inverter 1601, a power module 1602, a vs-GND capacitor 1603, a high voltage battery 1604, a battery cable 1605, a motor 1606, and an output cable 1607 are described using circuit symbols.

In the case of the equivalent circuit model, since an electric current imitating an actual operating current flows to each element in the equivalent circuit to generate noise, a load of a computer increases, but analysis close to an actual operation mode can be performed. For this reason, the noise analysis can be more accurately performed, for example, the noise analysis can be performed in each operation mode. In the case of the macro model, a case in which a noise value is maximum is assumed, and the analysis can be performed with a small load. It is possible to mount the part model of the equivalent circuit model and the part model of the macro model in the vehicle housing model together, and perform the noise analysis.

The two embodiments have been described above. The present invention is not limited to the above embodiments, and includes various modified examples. For example, the above embodiments have been described in detail to help understand the present invention, and all configurations described above need not be necessarily provided. Further, some configuration in a certain embodiment can be replaced with configurations in another embodiment, and configurations in another embodiment may be added to configurations of a certain embodiment as well. Furthermore, addition, deletion, or replacement of another configuration on some configurations of each embodiment can be performed.

Further, each information line is considered to be necessary for the purpose of description and illustrated, and all information lines necessary for the application to product development are not necessarily illustrated. Practically, almost all configurations may be considered to be connected to each other.

REFERENCE SIGNS LIST 1 processing unit
2 storage unit
3 input unit
4 output unit
5 connection line
11 vehicle selecting unit
12 part selecting unit
13 connection impedance deciding unit
14 part arrangement wiring path deciding unit
15 electromagnetic noise analyzing unit
21 vehicle housing model information storage unit
22 part model information storage unit
23 noise analysis result storage unit
201 vehicle housing model
202 inverter model
203 battery model
204 load model
207 noise emission
208 vehicle-mounted antenna

The invention claimed is:

1. An electromagnetic noise analysis method, comprising:
a housing model selecting process of acquiring a housing model through a housing model selecting unit;
a component model selecting process of selecting and acquiring component models through a component model selecting unit;
a connecting process of connecting the acquired component models using a wire through a connection deciding unit;
a component arranging process of arranging the acquired component models in the acquired housing model through a wiring unit;
a noise analyzing process of driving the arranged component models connected using the wire to generate electromagnetic noise from the component models and the wire, propagating the generated electromagnetic noise in the housing model, and calculating a noise amount through an electromagnetic noise analyzing unit; and
an outputting process of outputting data of the calculated noise amount through an output unit.

2. The electromagnetic noise analysis method according to claim 1,
wherein the housing model is a three-dimensional (3D) model, and
an outer circumference of the component model is a 3D model, and an inside thereof is a macro model or an equivalent circuit model.

3. The electromagnetic noise analysis method according to claim 2,
wherein the housing model includes positions at which the component and the wire are arranged or information of a candidate thereof.

4. The electromagnetic noise analysis method according to claim 1,
wherein a terminal of the component model includes information of a current source or a voltage source, a serial or parallel impedance, and a connection impedance of a connector, and
In the connecting process, the wire is connected to the terminal of the component, and values of the current source or the voltage source, the serial or parallel impedance, and the connection impedance of the connector are decided.

5. The electromagnetic noise analysis method according to claim 1,
wherein two or more types of component models are arranged in the housing model,
in the component model selecting process, a plurality of component models are acquired on one type of component, and
in the noise analyzing process, a noise amount calculation is performed twice or more while changing the component model, and a noise amount is calculated on each of combinations of the components.

6. The electromagnetic noise analysis method according to claim 5,
wherein a combination of the component models or the arrangement position in which the noise amount satisfies a certain condition as a result of performing the noise amount calculation twice or more is selected, listed, and output.

7. The electromagnetic noise analysis method according to claim 1,
wherein the housing model includes a plurality of arrangement positions on one component model or wire, and
in the noise analyzing process, a noise amount calculation is performed twice or more while changing the arrangement position of the component model or the wire, and a noise amount calculation is performed twice or more on each of the arrangement positions.

8. The electromagnetic noise analysis method according to claim 1,
wherein the component model includes an attribute value of the component model, and
in the outputting process, the attribute value of the component model used for a noise calculation is output together with the noise amount.

9. The electromagnetic noise analysis method according to claim 1,
wherein the component model includes a cost or weight of a component, and
in the outputting process, a sum of costs or a sum of weights of components used for a noise calculation is output together with the noise amount.

10. The electromagnetic noise analysis method according to claim 1,
wherein the housing is a housing of an automobile, and the component is an electric part of an automobile.

11. An electromagnetic noise analysis device, comprising:
a housing model selecting unit configured to acquire a housing model;
a component model selecting unit configured to select and acquire component models;
a connection deciding unit configured to connect the acquired component models using a wire;
a wiring unit configured to arrange the acquired component models in the acquired housing model;
an electromagnetic noise analyzing unit configured to drive the arranged component models connected using the wire to generate electromagnetic noise from the component models and the wire, propagate the generated electromagnetic noise in the housing model, and calculate a noise amount; and
an output unit configured to output data of the calculated noise amount.

12. The electromagnetic noise analysis device according to claim 11,
wherein the housing model is a three-dimensional (3D) model, and
an outer circumference of the component model is a 3D model, and an inside thereof is a macro model or an equivalent circuit model.

13. The electromagnetic noise analysis device according to claim 12,
wherein the housing model includes positions at which the component and the wire are arranged or information of a candidate thereof.

14. The electromagnetic noise analysis device according to claim 11,
wherein a terminal of the component model includes information of a current source or a voltage source, a serial or parallel impedance, and a connection impedance of a connector, and
the connection deciding unit connects the wire to the terminal of the component, and decides values of the current source or the voltage source, the serial or parallel impedance, and the connection impedance of the connector.

15. The electromagnetic noise analysis device according to claim 11,
wherein two or more types of component models are arranged in the housing model,
the component model selecting unit acquires a plurality of component models are acquired on one type of component, and
the noise analyzing unit performs a noise amount calculation twice or more while changing the component model, and calculates a noise amount on each of combinations of the components.

16. The electromagnetic noise analysis device according to claim 15,
wherein a combination of the component models or the arrangement position in which the noise amount satisfies a certain condition as a result of performing the noise amount calculation twice or more is selected, listed, and output.

17. The electromagnetic noise analysis device according to claim 11,
wherein the housing model includes a plurality of arrangement positions on one component model or wire, and
the noise analyzing unit performs a noise amount calculation twice or more while changing the arrangement position of the component model or the wire, and performs a noise amount calculation twice or more on each of the arrangement positions.

18. The electromagnetic noise analysis device according to claim 11,
wherein the component model includes an attribute value of the component model, and
the output unit outputs the attribute value of the component model used for a noise calculation together with the noise amount.

19. The electromagnetic noise analysis device according to claim 11,
wherein the component model includes a cost or weight of a component, and
the output unit outputs a sum of costs or a sum of weights of components used for a noise calculation together with the noise amount.

20. The electromagnetic noise analysis device according to claim 11,
wherein the housing is a housing of an automobile, and
the component is an electric part of an automobile.

* * * * *